May 12, 1953     S. S. POKORNY     2,638,235
LOADING MECHANISM FOR OFFSET TRACTORS
Filed Dec. 21, 1949     2 Sheets-Sheet 2
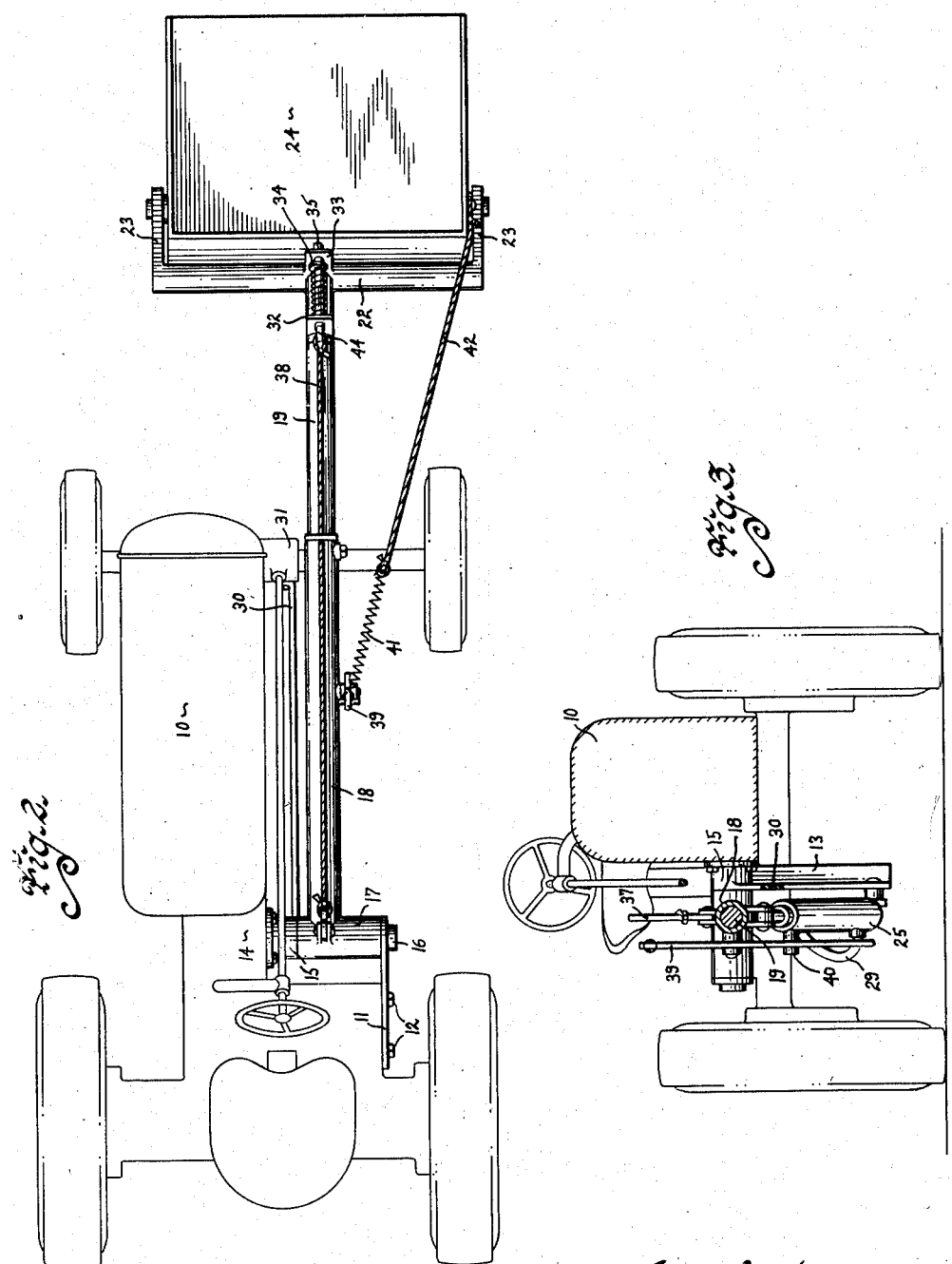
Inventor
Stephen S. Pokorny
by M. Talbert Dick
Attorney Patented May 12, 1953

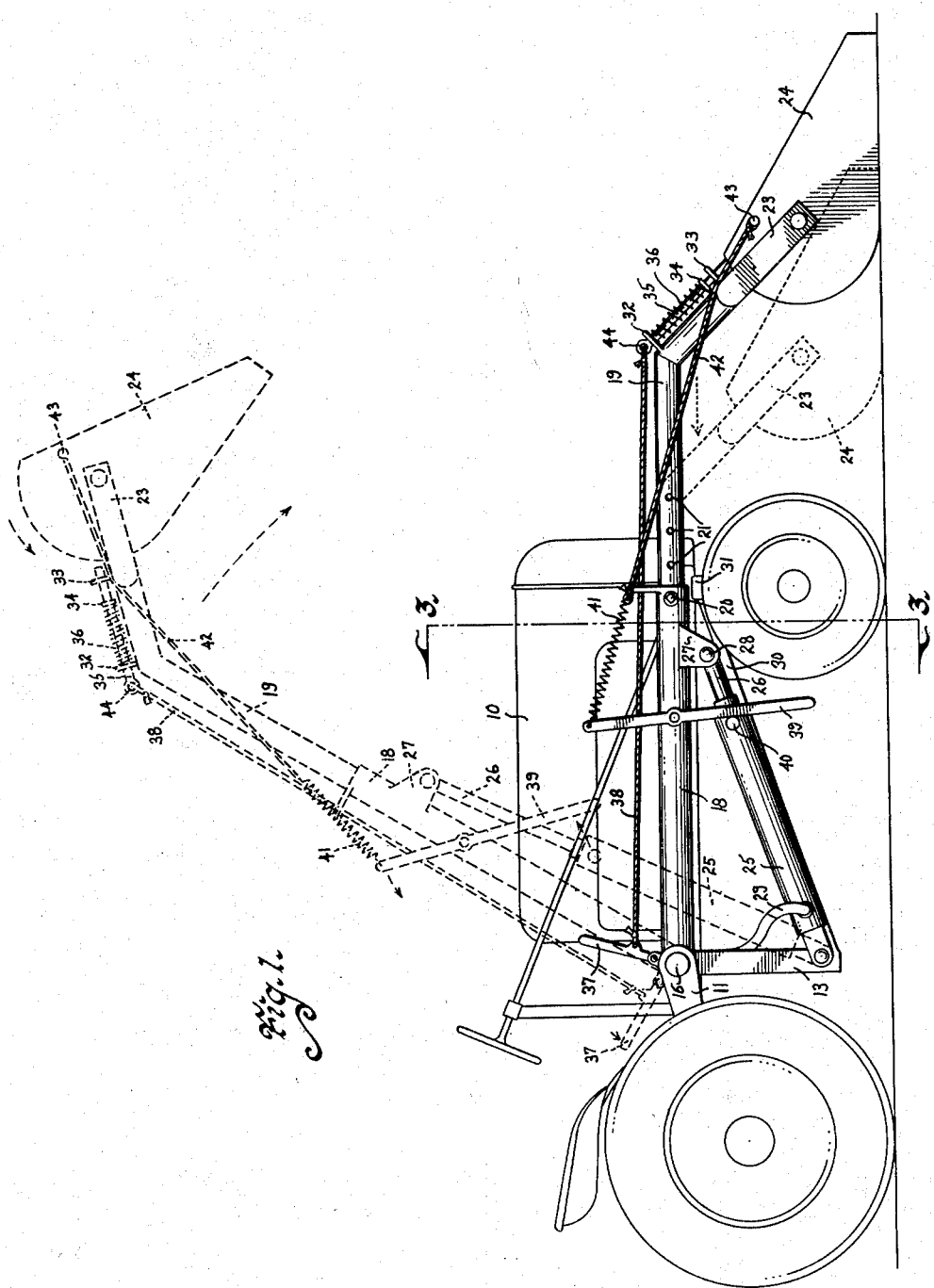

2,638,235

UNITED STATES PATENT OFFICE 2,638,235

LOADING MECHANISM FOR OFFSET TRACTORS

Stephen S. Pokorny, Maquoketa, Iowa

Application December 21, 1949, Serial No. 134,170

3 Claims. (Cl. 214—140)

My invention relates to a loading mechanism for tractors or the like and more particularly to such a mechanism adapted for use on the off-set type tractor.

This present invention is in the same art as my Patent No. 2,482,365 dated September 20, 1949, on Loaders For Tractors. That patent was designed for use with conventional type tractors, and utilizes a pair of lifting arms disposed on opposite sides of the tractor. Such a lifting means cannot be used, however on the tractors having the engine mounted in an off center position, for the reason that the engine at one side of the tractor would interfere with one of the lifting arms. The off-set tractors are of rather recent vintage and are rapidly becoming increasingly more popular. Not only is the engine mounted off center in relation to the longitudinal center plane of the tractor to give the operator an unobstructed view to the front, but also it can be mounted lower than on other type tractors so as to require much less head room when passing through barn doors and the like. My patent invention is adapted for these off-set tractors and contains other improvements hereinafter described.

It is therefore an object of my invention to provide a single arm loading mechanism that is designed to be mounted on a tractor having an off-center mounted engine so that the lifting arm extends forwardly on substantially the longitudinal center plane of the tractor.

A further object of this invention is to provide a single lifting arm of the above class that can be used on tractors having a hydraulic lifting means.

A still further object of this invention is to provide a single lifting arm for a loading mechanism on an off-set type tractor that is easily and quickly adjustable as to length.

A still further object of this device is to provide a loading mechanism of the above classes in which the forward portion of the lifting arm to which the scoop is secured can easily and quickly be detached from or attached to that portion of the lifting arm secured to the tractor and thereby making it possible to quickly convert the tractor to uses other than loading lifting without the necessity for detaching that portion of the lifting mechanism connected to the tractor and the hydraulic jacks.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a side view of an off-set type tractor showing my device mounted thereon and in its lowered position. The dotted lines at the bottom indicates a longitudinal adjustment of the forward portion of the lifting arm and the upper dotted lines indicate this loading mechanism in its elevated position, Fig. 2 is a top plan view of the device shown in Fig. 1, and Fig. 3 is a front view of this device with part in cross-section shown mounted on an off-set tractor and taken on the line 2—2 of Fig. 1.

Referring to the drawings I have used the numeral 10 to designate what is known as an off-set tractor. Such a tractor has its engine mounted off center in relation to the tractor frame, as illustrated in Figs. 2 and 3. It is for such a tractor that my loading device is more particularly adapted. A support arm 11 is secured to the rearwardly side of the tractor frame opposite the side on which the engine is mounted. This arm can be secured in any suitable manner such as by the bolts 12 and it extends to a point forwardly of the operator's seat, as shown in Fig. 2. Transversely opposite the forward end of the arm 11 a vertical support arm 13 is secured at its top to the frame portion 14 of the tractor 10. Extending outwardly from the top of the support arm 13 is the bearing socket 15, as shown in Fig. 3. The numeral 16 designates a shaft member mounted at one end through the forward end of the arm 11 and in the bearing socket 14 at its other end.

Rotatably mounted on the shaft 16 is the sleeve member 17. The numeral 18 designates an elongated tubular lifting arm that is rigidly secured at the rearwardly end to the sleeve 17. By this construction the lifting arm is vertically pivotally mounted and while I have described one method of accomplishing this, there are many other ways in which this can be done. The lifting arm 18 when mounted as described will extend forwardly to the front portion of the tractor on substantially the longitudinal center plane thereof.

Designed to telescope into the forward end of the lifting arm 18 is the detachable arm portion 19 that is formed in a modified inverted V shape as shown in Fig. 1. This detachable arm 19 is longitudinally adjustable within the arm 18 by securing the bolt 20 in any one of the holes 21.

A cross bar 22 is secured to the forward end of the arm portion 19 and an ear 23 extends forwardly from each end of this bar, as shown in Fig. 2. The numeral 24 designates a scoop member positioned between the ears 23 and vertically pivotally secured thereto.

A hydraulic jack 25 is pivotally mounted at one end to the bottom of the arm 13 and the plunger 26 on the jack 25 is pivotally secured to the underside of the lifting arm 18 by any suitable means such as the connecting plate 27 and pin 28. The numeral 29 designates a hose member connected at one end to the jack 25 and designed to be attached to a source of fluid pressure at its other end. A rod brace member 30 is secured at one end to the bottom of the arm 13 and at its other end to the front axle housing 31. Secured on the top of the downwardly extending portion of the detachable arm 19 are two longitudinally spaced apertured guide brackets 32 and 33 and an apertured stop member 34 secured thereon between the guides 32 and 33 and spaced therefrom through which there is slidably mounted the catch pin 35. The forward end of the pin is designed to engage the top rear of the scoop 24 and preferably enters a small opening therein. A coil spring 36 is arranged on the pin 34 so that one end engages the front of the guide 32 and the other end engages the back of the stop 34. The numeral 37 designates a hand lever pivotally secured at its bottom to the top of the sleeve 17 and the numeral 38 designates a taut cable secured at one end to the lever 37 and at its other end to an eye 44 on the rear of the pin 35.

An elongated lever 39 is pivotally secured at a point between its ends to the side of the lifting arm 19 transverse to the longitudinal axis thereof, as shown in Fig. 1. The bottom portion of the lever 39 is designed to pass along the outside of the jack 25 with the back edge thereof capable of engaging the boss 40 extending outwardly from the jack, as shown in Fig. 1.

To the top of the lever 39 there is secured one end of a coil spring 41. One end of a cable 42 is secured to the other end of the spring 41 and the other end is secured to the lug 43 on the upper rear side portion of the scoop 24.

In operation the hose 29 will be connected to a source of fluid pressure which is produced by the tractor engine and controllable by the operator so that when pressure is applied to the jack 25 the scoop will be elevated, as shown in Fig. 1. The hand lever 37, cable 38 and pin 35 constitute a control means to prevent the scoop from dumping its load until the operator desires. By manually pulling backwardly on the lever 37, the pin 35 will be disengaged from the scoop which will dump its load by force of gravity. When the lever 37 is released the coil spring 36 will move the pin 35 forwardly and yieldingly hold it against the back of the scoop. As the lifting arm 18 is lowered by the release of the hydraulic pressure the boss 40 on the jack will engage the lower portion of the lever 39 and move it forwardly. This will obviously extend the spring 41 and tend to take the slack out of the cable 42 with the result that as the scoop nears the ground, the bottom thereof will be substantially on a plane parallel with the ground. Consequently, the bottom of the scoop will contact the ground rather than the end of the scoop and as the scoop returns to its load receiving position shown in Fig. 1 the pin 35 will snap into place to prevent any accidental dumping as previously described. Without this control means comprising the lever 39, spring 41 and cable 42 it can be seen from the elevated position of the scoop in Fig. 1 that the bottom thereof would probably contact the ground when it is lowered and thus require the operator to maneuver the tractor to jockey the scoop into load receiving position. My control means makes this unnecessary.

Some changes may be made in the construction and arrangement of my loading mechanism for off-set tractors without departing from the real spirit and purpose of my invention, and it is my intention to cover by my claims, any modified forms of structure or use of mechanical equivalents which may be reasonably included within their scope.

I claim:

1. In combination with a tractor having its prime mover resting in a plane at one side of its center longitudinal axis, and a loader mechanism, comprising, a single elongated tubular beam pivotally secured adjacent the center rear portion of said tractor and extending forwardly adjacent the inner side of the prime mover of said tractor, a second beam member having its forward end portion bent forwardly and downwardly and having its rear end portion slidably adjustably detachably extending into the forward end portion of said tubular beam, a shovel member on the forward end of said second beam, a means for securing said two beam members against relative movement at times, and a power means for lifting said tubular beam at times.

2. In combination with an off-set tractor, a load lifting mechanism, comprising, a bearing socket on said tractor, an arm member secured at one end to the rear of said tractor and its other end extending to a point oppositely disposed to and spaced from said socket, a shaft member secured between said socket and the free end of said arm, a sleeve rotatably arranged on said shaft, a single lifting arm secured at its rearwardly end to said sleeve; said lifting arm extending forwardly adjacent the longitudinal center plane of said tractor and extending forwardly therefrom, a cross bar secured at its center portion to the forward end of said lifting arm and perpendicular thereto, a forwardly extending ear member on each end of said cross bar, a load receiving means arranged between said ear members and vertically pivotally secured thereto, a hydraulic jack pivotally secured at one end to said tractor at a point below the pivot point of said lifting arm; the plunger rod on the other end of said jack pivotally secured to the under side of said lifting arm at a point between the ends of said arm, and a means for operating said jack.

3. In combination with a tractor having its prime mover resting in a plane at one side of its center longitudinal axis, a loader mechanism, comprising, a bearing socket on said tractor, an arm member secured at one end to the rear of said tractor and its other end extending to a point oppositely disposed to and spaced from said socket, a shaft member secured between said socket and the free end of said arm, a sleeve rotatably arranged on said shaft, a single beam secured at its rearwardly end to said sleeve and extending forwardly adjacent the inner side of said prime mover, said sleeve being incapable of lateral movement and serving to brace said beam against lateral movement and torque, a load holding means secured to the forward end of said beam and solely supported by said single elongated beam, and a power means for moving said beam in one direction at times.

STEPHEN S. POKORNY.

References Cited in the file of this patent

UNITED STATES PATENTS

| Number | Name | Date |
|---|---|---|
| 1,321,983 | Cole | Nov. 18, 1919 |
| 1,622,456 | Liebmann | Mar. 29, 1927 |
| 1,773,066 | Thomas | Aug. 12, 1930 |
| 2,363,986 | Mott | Nov. 28, 1944 |
| 2,398,585 | Hayward | Apr. 16, 1946 |
| 2,416,893 | Barker | Mar. 4, 1947 |
| 2,446,827 | Hall | Aug. 10, 1948 |
| 2,468,602 | Lord | Apr. 26, 1949 |
| 2,501,112 | Webster | Mar. 21, 1950 |
| 2,520,451 | Baker | Aug. 29, 1950 |
| 2,531,993 | Smith | Nov. 28, 1950 |